US010240569B2

United States Patent
Martinez et al.

(10) Patent No.: US 10,240,569 B2
(45) Date of Patent: Mar. 26, 2019

(54) INTERNAL COMBUSTION ENGINE WITH INJECTION OF TWO FUEL JETS AT DIFFERENT FLOW RATES AND FUEL-INJECTION METHOD FOR SUCH AN ENGINE

(71) Applicant: IFP Energies nouvelles, Rueil-Malmaison (FR)

(72) Inventors: Lionel Martinez, Maulette (FR); Stéphane Richard, Bazainville (FR); Olivier Laget, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 15/117,117

(22) PCT Filed: Jan. 22, 2015

(86) PCT No.: PCT/EP2015/051281
§ 371 (c)(1),
(2) Date: Aug. 5, 2016

(87) PCT Pub. No.: WO2015/117834
PCT Pub. Date: Aug. 13, 2015

(65) Prior Publication Data
US 2017/0167459 A1   Jun. 15, 2017

(30) Foreign Application Priority Data

Feb. 10, 2014  (FR) ...................................... 14 51017

(51) Int. Cl.
*F02B 23/06* (2006.01)
*F02M 61/18* (2006.01)

(52) U.S. Cl.
CPC ..... *F02M 61/1813* (2013.01); *F02B 23/0669* (2013.01); *F02B 23/0672* (2013.01);
(Continued)

(58) Field of Classification Search
CPC ............... F02M 61/14; F02M 61/1806; F02M 61/1813; F02M 61/182; F02M 45/086;
(Continued)

(56) References Cited

U.S. PATENT DOCUMENTS

| | | | |
|---|---|---|---|
| 6,513,487 B1 * | 2/2003 | Jorach | F02B 1/12 123/269 |
| 6,659,071 B2 * | 12/2003 | LaPointe | F02B 1/04 123/295 |

(Continued)

FOREIGN PATENT DOCUMENTS

| | | |
|---|---|---|
| DE | 10 2011 017479 A1 | 10/2012 |
| EP | 1 469 193 A1 | 10/2004 |

(Continued)

OTHER PUBLICATIONS

International Search Report for PCT/EP2015/051281 dated Apr. 1, 2015; English translation submitted herewith (7 Pages).

*Primary Examiner* — Hung Q Nguyen
*Assistant Examiner* — Johnny H Hoang
(74) *Attorney, Agent, or Firm* — Fitch, Even, Tabin & Flannery LLP

(57) ABSTRACT

The present invention is a compression-ignition direct-injection internal-combustion engine comprising at least a cylinder, a cylinder head carrying fuel injection, a piston sliding in the cylinder, a combustion chamber limited on one side by upper face of the piston comprising a projection extending in the direction of the cylinder head and in the center of a concave bowl (46) with at least two mixing zones. The fuel injection projects fuel in at least two fuel jet sheets with different sheet angles, with a lower sheet having a jet axis C1 for one zone and an upper sheet having a jet axis for the other zone.

(Continued)

The injection feeds fuel into the combustion chamber with a different flow rate for each sheet for dedicated targeting in the mixing zones of the combustion chamber.

23 Claims, 2 Drawing Sheets

(52) U.S. Cl.
CPC ...... *F02M 61/182* (2013.01); *F02M 61/1826* (2013.01); *F02M 61/1846* (2013.01); *Y02T 10/125* (2013.01)

(58) Field of Classification Search
CPC ..... F02B 1/12; F02B 9/02; F02F 1/242; F02F 3/26; Y02T 10/125
USPC ....... 123/275, 276, 290, 294, 301, 305, 307, 123/1 A, 27 GE, 525–527, 575
See application file for complete search history.

(56) References Cited

U.S. PATENT DOCUMENTS

| | | | | |
|---|---|---|---|---|
| 7,942,126 B2* | 5/2011 | Zoller | ................. | F02B 23/0651 123/298 |
| 2002/0011223 A1* | 1/2002 | Zauner | ................... | F02B 25/14 123/73 B |
| 2003/0097997 A1* | 5/2003 | Lynch | ..................... | F02B 43/00 123/27 GE |
| 2004/0020457 A1* | 2/2004 | Regueiro | ............ | F02B 23/0669 123/276 |
| 2005/0120995 A1* | 6/2005 | Tsujimoto | ........... | F02B 23/0669 123/299 |
| 2008/0142622 A1 | 6/2008 | Gray | | |
| 2009/0194081 A1* | 8/2009 | Ito | ........................... | F02B 69/02 123/575 |
| 2014/0048036 A1 | 2/2014 | Zoeller et al. | | |
| 2014/0158071 A1* | 6/2014 | Svensson | .............. | F02B 75/021 123/64 |
| 2015/0101565 A1* | 4/2015 | Gutzer | ................ | F02D 41/3094 123/299 |
| 2016/0265418 A1* | 9/2016 | Martinez Alvarado | ... | F02B 1/12 |
| 2016/0341106 A1* | 11/2016 | Richard | ............ | F02M 45/086 |
| 2016/0348571 A1* | 12/2016 | Huang | ................... | F02B 43/00 |
| 2017/0051657 A1* | 2/2017 | Martinez | ............ | F02B 23/0669 |
| 2017/0082013 A1* | 3/2017 | Martinez | ............ | F02B 23/0669 |
| 2017/0096978 A1* | 4/2017 | Martinez | ............ | F02B 23/0672 |

FOREIGN PATENT DOCUMENTS

| | | |
|---|---|---|
| EP | 1 676 997 A1 | 7/2006 |
| FR | 2 887 586 A1 | 12/2006 |
| JP | H09 317604 A | 12/1997 |
| WO | 2009/067495 A2 | 5/2009 |

\* cited by examiner

INTERNAL COMBUSTION ENGINE WITH INJECTION OF TWO FUEL JETS AT DIFFERENT FLOW RATES AND FUEL-INJECTION METHOD FOR SUCH AN ENGINE

CROSS-REFERENCE TO RELATED APPLICATION

Reference is made to PCT Application PCT/EP2015/051281 filed Jan. 22, 2015, and French Patent Application No. 14/51.017 filed Feb. 10, 2014, which applications are incorporated herein by reference in their entirety.

BACKGROUND OF THE INVENTION

Field of the Invention

The present invention relates to a direct-injection combustion engine, and more particularly to a compression-ignition engine and to a method of using same and more particularly relates to such an engine usable in the air transport or road sector, or in stationary equipment such as engine generators.

Description of the Prior Art

This type of engine generally comprises at least a cylinder, a piston provided with a projection arranged in a concave bowl which slides in the cylinder in a reciprocating rectilinear motion, an intake for an oxidizer a burnt gas exhaust, a combustion chamber and an injection system for injecting fuel into the combustion chamber.

As it is generally known, upon design of an engine, the performance, pollutant emissions and mechanical strength constraints of the combustion chamber are increasingly high while the construction for meeting these constraints are quite the opposite.

Thus, a performance increase generally leads to an increase in emissions and to higher mechanical stress.

In order to overcome these constraints and to guarantee low emissions and satisfactory mechanical strength over the entire operating range of the engine, in particular at very high load, to use all the oxidizer present in the combustion chamber, it is important to use an oxidizer comprising air at ambient pressure, supercharged air or a mixture of air (supercharged or not) and of recirculated burnt gas.

Indeed, the fuel mixture (oxidizer and fuel) in the combustion chamber needs to be as homogeneous as possible.

In practice, the fuel remains confined in the bowl and it cannot mix with the oxidizer contained notably in the compression zone that is the volume in the upper part of the combustion chamber limited by the cylinder wall and the face of the cylinder head opposite the piston. This creates high richness zones in the combustion chamber which generate a high production of soot, carbon monoxide and unburnt hydrocarbons (HC) upon combustion of the fuel mixture.

Furthermore, the thermal load is focused on the re-entrant part of the piston, that is the bowl neck or diameter restriction that marks the transition between the piston bowl and the upper zone encompassing the compression zone, which may be limited at very high loads.

In order to overcome these drawbacks, and as better described in French patent application No. 13-60,426 filed by the applicant, the use of an internal-combustion engine having fuel injection with jets having at least two sheet angles and a piston comprising a bowl provided with a projection with two combustion zone volumes and internal aerodynamics substantially improves the combustion quality.

This permits use of a larger amount of oxidizer compared to conventional engines and to distribute the thermal load over a larger surface area of the combustion chamber.

However, although this solution provides performance gains, using an injection system with a double sheet angle needs to be specific for injecting fuel amounts matching the volumes of the combustion zones.

Indeed, the volumes of these combustion zones are substantially different and an injection system with a conventional double sheet angle will inject an identical amount of fuel in each one of these two zones.

The mixture and the richness in each zone will therefore be different.

In particular, the compression zone, which has a low effective volume of oxidizer, is too rich in relation to the richness in the bowl bottom, which generates too much soot and unburnt hydrocarbons.

SUMMARY OF THE INVENTION

The present invention overcomes the aforementioned drawbacks with an engine and a method which obtains better mixing of the gaseous fluid (oxidizer) and the injected fuel. The better richness control is achieved in the combustion chamber by use of a specific fuel injection system having at least two sheet angles.

The invention relates to a compression-ignition direct-injection internal-combustion engine comprising at least a cylinder, a cylinder head carrying fuel injection, a piston sliding in the cylinder, a combustion chamber limited on one side by the upper face of the piston comprising a projection extending in the direction of the cylinder head and located in the center of a concave bowl with at least two mixing zones. The fuel injection projects fuel in at least two fuel jet sheets with different sheet angles. A lower sheet having jet axis C1 for the zone and an upper sheet having jet axis C2 for the zone is provided which axes extend respectively toward and into the lower and upper mixing zones. The engine comprises fuel injection means feeding fuel into the combustion chamber having a different flow rate for each sheet which provides dedicated targeting in the two distinct mixing zones of the combustion chamber.

The fuel flow rate of the upper jet sheet can be lower than the fuel flow rate of the lower jet sheet.

The flow rate of the upper sheet can be at least 10% lower than the flow rate of the lower sheet.

The flow rate of the upper sheet can be 20% to 40% lower than the flow rate of the lower sheet.

The fuel injection means can comprise an injector which projects fuel in at least two fuel jet sheets arranged axially one above the other, with a cone having a different angle for each sheet.

The fuel injection can comprise at least two injectors projecting fuel in fuel jet sheets having a cone forming a different angle for each sheet.

The injectors can have different permeabilities.

The sheet angle of one of the sheets can be at most 130° while the sheet angle of the other sheet can be at least 130°.

The invention also relates to an injection method for a compression-ignition direct-injection internal-combustion engine comprising at least a cylinder, a cylinder head carrying a fuel injection, a piston sliding in the cylinder, a combustion chamber limited on one side by the upper face of the piston comprising a projection extending in the direction of the cylinder head and located at the center of a concave bowl. The method injects the fuel in at least two fuel jet sheets with different sheet angles, a lower sheet has jet axis C1 and an upper sheet has jet axis C2, wherein a different amount of fuel are injected for each combustion zone with the two jet sheets.

The method can consist in injecting the fuel with a difference in amount of at least 10% between the two sheets.

BRIEF DESCRIPTION OF THE DRAWINGS

Other features and advantages of the invention will be clear from reading the description hereafter, given by way of non-limitative example, with reference to the accompanying figures wherein.

DETAILED DESCRIPTION OF THE INVENTION

Figure 1:
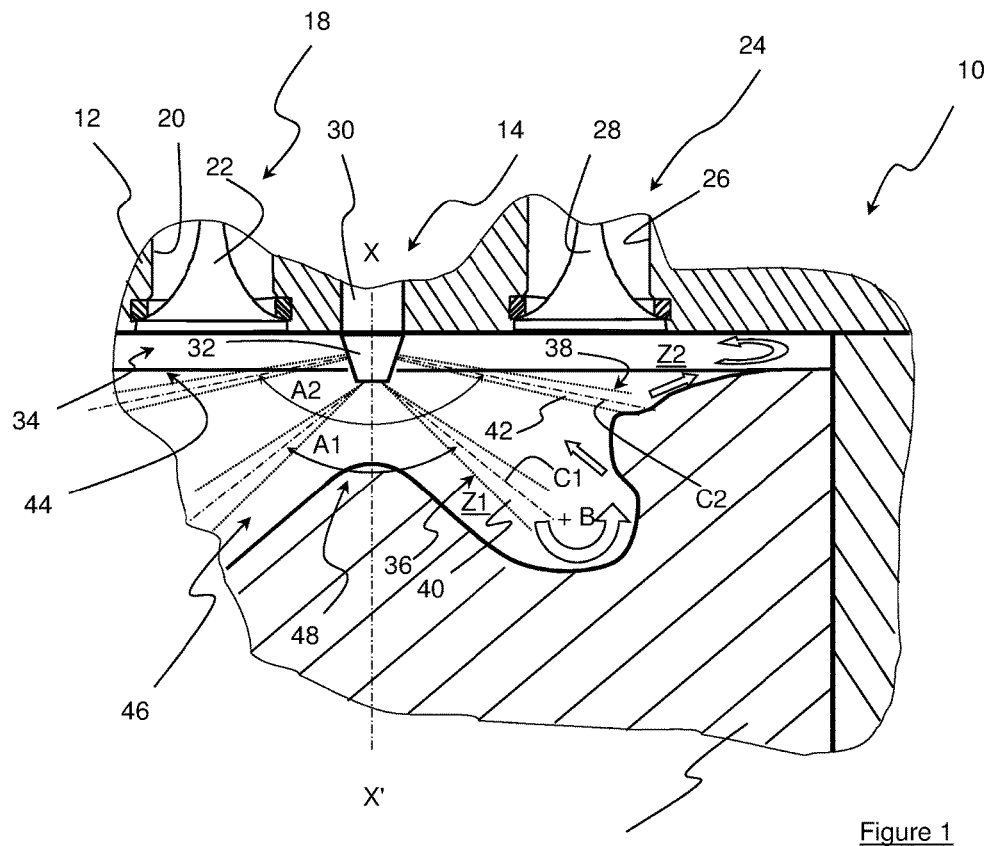
FIG. 1 shows an internal-combustion engine according to the invention.

With reference to FIG. 1, a compression-ignition direct-injection internal-combustion engine comprises at least a cylinder 10, a cylinder head 12 closing the cylinder in the upper part, fuel injection 14 carried by the cylinder head and a piston 16 having axis XX' which slides in the cylinder with a reciprocating rectilinear motion.

Fuel is understood to be a liquid fuel such as diesel fuel, kerosene or any other fuel with the physicochemical characteristics allowing operation of an engine of compression ignition type including a direct fuel injection system for this fuel.

This engine also comprises a burnt gas exhaust 18 with at least one exhaust pipe 20 whose opening can be controlled such as by any means such as an exhaust valve 22 and an intake means 24 for an oxidizer with at least one intake pipe 26 whose opening can be controlled by any means such as an intake valve 28.

An oxidizer is understood to be air at ambient pressure, supercharged air or a mixture of air (supercharged or not) and burnt gas.

The fuel injection system comprises at least one fuel injector 30, preferably arranged along axis XX' of the piston, whose nozzle 32 comprises a multiplicity of orifices through which the fuel is sprayed and projected in the direction of combustion chamber 34 of the engine.

It is from the injection that the projected fuel forms at least two fuel jet sheets, here two conical sheets 36 and 38 of fuel jets 40 and 42, which, in the example shown, have a general axis aligned with piston 16 while being positioned axially one above the other.

More precisely, sheet conical 36 that is the closer to piston 16 is referred to as lower sheet in the description below, while conical sheet 38 that is further away from the piston is referred to as upper sheet.

As can be seen in FIG. 1, the two sheets form sheet angles A1 and A2 which are conical and different from one another. A sheet angle is understood to be the top angle formed by the cone originating from the injector, whose imaginary peripheral wall passes through all the axes C1 or C2 of fuel jets 40 or 42.

Advantageously, sheet angle A1 of the lower sheet is at most equal to 130°, preferably ranging between 40° and 130°, while sheet angle A2 of the upper sheet is at most equal to 180° and preferably ranges between 150° and 180°.

Figure 2:
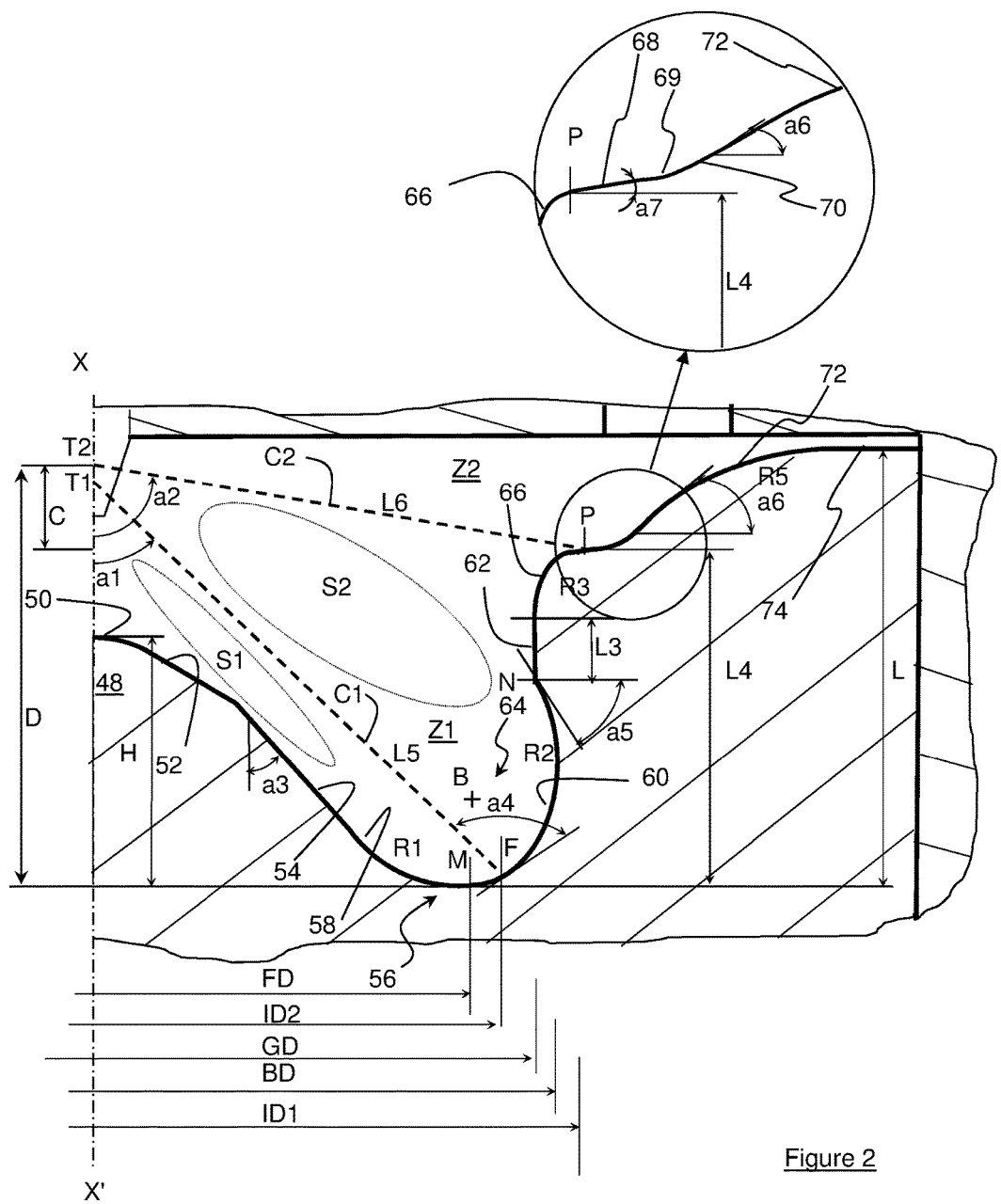
FIG. 2 is a large-scale partial view of a half section of the piston bowl profile of the engine of FIG. 1.

For simplification reasons, in the rest of the description, angle a1 corresponds to A1/2 and angle a2 corresponds to A2/2 (See FIG. 2).

The difference between the two sheet angles is thus at least 50°. This limits fuel jet overlap between the two sheets and therefore formation of pollutants such as soot.

Of course, it is possible for the injection to not be positioned along axis XX'. In this case, the general axis of the fuel jet sheets from the fuel injector is at least substantially parallel to axis XX'.

Similarly, it is possible for each sheet to be provided by a distinct fuel injector (single-sheet injector) with dedicated targeting of the distinct zones of the combustion chamber.

Combustion chamber 34 is limited by the inner face of cylinder head 12 opposite the piston, the circular inner wall of cylinder 10 and upper face 44 of piston 16.

The upper face of the piston comprises a concave bowl 46, whose axis is aligned with the cylinder, having concavity directed towards the cylinder head and which houses a projection 48 substantially in the center of the bowl, which rises towards cylinder head 12, while being preferably coaxial with the axis of the fuel sheets from injector 30.

Of course, it is possible for the axis of the bowl to not be coaxial with that of the cylinder. The main concept is to have a layout according to which the axis of the fuel jet sheet, the axis of the projection and the axis of the bowl are preferably aligned.

Furthermore, with reference to FIG. 2, projection 48, is generally of truncated shape and comprises a preferably rounded top 50 which is extended, while moving symmetrically away from axis XX' towards the outside of piston 16, by a substantially rectilinear inclined surface 52 extended by an inclined flank 54 down to a bottom 56 of the bowl.

Of course, without departing from the scope of the invention, inclined surface 52 can be eliminated and then inclined flank 54 connects the top of the_projection to the bottom of the bowl.

In the example of FIG. 2, the bottom of the bowl is rounded to have a concave rounded surface 58 in form of an arc of a circle with radius R1, which is referred to as inner rounded surface, and which is connected to the bottom of inclined flank 54, and another concave rounded surface 60 in form of an arc of a circle with radius R2, which is referred to as outer rounded surface, and which is connected by one of its ends to the lower end of the inner rounded surface at a point M and by the other end thereof to a lateral wall 62, substantially vertical here, at a point N.

The two rounded surfaces 58 and 60 thus limit the lower part of a toroidal volume, which here is a torus of substantially cylindrical section 64 and of center B whose purpose is explained in the rest of the description below.

Lateral wall 62 is extended, while moving away from axis XX', by a convex rounded surface 66 in form of an arc of a circle with radius R3, which is referred to as re-entrant, leading to an inclined plane 68 linked to a concave inflection surface 69 connected to a substantially plane surface 70. This plane surface is continued by an outer convex surface 72 in form of an arc of a circle with radius R5 that leads to a plane surface 74 extending up to the vicinity of the cylinder wall.

The combustion chamber thus comprises two distinct zones Z1 and Z2 at which mixing of the oxidizer (air, supercharged or not, or a mixture of air and recirculated burnt gas) with the fuel projected from the injector, as well as combustion of the fuel mixture, occurs.

Zone Z1, limited by projection 48, torus 64 at the bowl bottom, wall 62 and convex rounded surface 66, forms the lower zone of the combustion chamber associated with lower sheet 36 having fuel jets of axis C1 which extends toward and into the lower mixing zone. Zone Z2, limited by inclined plane 68, concave surface 69, substantially plane surface 70, convex surface 72, plane surface 74, the peripheral inner wall of the cylinder and cylinder head 12, forms the upper zone of the chamber associated with upper sheet 38 of fuel jets having axis C2 which extends toward and into the upper mixing zone.

In this configuration, the bowl comprises, for a piston position close to the top dead center:

a bowl bottom having outside diameter FD with a radius between axis XX' and the lowest point M of the bowl, that is at the intersection between the surfaces of radius R1 and R2;

a bowl opening of diameter BD having a radius in the vicinity of the bowl bottom and corresponding to a distance taken between axis XX' and the furthest point of outer concave surface 60;

a neck of diameter GD with a radius corresponding to the distance between axis XX' and vertical wall 62 limiting the outlet section of this bowl, an upper injection diameter ID1 having a radius corresponding to the distance between axis XX' and the start of inflection surface 69 at point P between inclined plane 68 and concave surface 66 by limiting a length L6 of jets 38 between the origin T2 of axis C2 of the jets on the axis of the injector nozzle and point P, satisfies with the formula ID1/sin(a2), a developed length of the diametral half section Cb of the bowl, having the length extending from the intersection of the projection top with axis XX' to the cylinder wall;

a projection height H between the bowl bottom at point M and the top of the projection, a bowl height L extending between the bowl bottom at point M and plane surface 74, a junction height L3 corresponding to the extension of lateral wall 62 between the end of outer rounded surface 60 at point N and the start of outer rounded surface 66, a height L4 between point P and point M, an angle of inclination a3 with respect to a vertical for inclined flank 54, an angle of inclination a4 formed by principal axis C1 of the fuel jets of lower sheet 36 impacting the torus with a tangential to impact point F by limiting a length L5 of jets 40 between origin T1 of axis C1 of the jets on the axis of the injector nozzle and point F. The length L5 satisfies the formula ID2/sin(a1), with ID2 corresponding to a lower injection diameter with a radius corresponding to the distance between axis XX' and point F, an angle of inclination a5 considered at the tangency of outer rounded surface 60 with lateral wall 62 at point N, an angle of inclination a6 with respect to the horizontal and the tangent to substantially plane wall 70, and an angle of inclination a7 with respect to the horizontal and inclined plane 68 at intersection point P.

All these parameters are expressed for a position of piston 16 in the vicinity of the top dead center corresponding to a distance D between point M and the origin T2 of axis C2 of jets 42.

More precisely, this distance D is equal to the sum of height L4 and height C. Height C corresponds to the axial height between origin T2 and point P. This height satisfies to formula ID1/tan(a2).

Thus, the dimension and angle parameters of the bowl meet at least one of the following conditions:

angle a4 is greater than 80°, which amounts to passing more than half the fuel jet between center B of torus 64 and the projection, more precisely the lower part at the level of point M, and thus generates an aerodynamic upward motion in the torus towards the top of the cylinder, angle a5 must be positive and less than 90°. Preferably, it has to be of the order of 30° to 40° so as to direct fuel jets 40 of lower sheet 36 towards oxidizer volume S1 in order to use the oxidizer of this zone while limiting upflow of the fuel towards upper sheet 38, oxidizer volume S1 positioned between fuel jets 40 of the lower sheet is minimized, still with a view to optimizing the use of oxidizer in the chamber, the position of the top of projection 48 is as close as possible to nozzle 32 of injector 30 to limit the volume of oxidizer under the injector that will not be impacted by the fuel jets, which again minimizes volume S1. Thus, ratio H/L is greater than 40% and preferably greater than 60%, angle a3 is substantially equal to or greater than angle a1 of the lower sheet (−10°<a3−a1<10°). Thus, the general axis of the lower sheet jets is tangential to flank 54 of the projection. Fuel jets 40 of lower sheet 36 can thus interact with rounded surface 58 by vaporizing totally prior to impacting the piston, oxidizer volume S2 between the two sheets is not zero since the interaction between the sheets is detrimental to the pollutants. Volume S2 however needs to be minimized. Therefore, junction length L3 between the torus and re-entrant 66 (convex rounded surface of radius R3) has to be such that L3/(2*length of R2)<1 or (L3/length of R2<2) in order to ensure that oxidizer volume S2 available between the upper 38 and lower 36 sheets is low in relation to the fuel volume generated by the jets of the lower sheet, second combustion zone Z2 arranged in the upper part of the piston that starts from re-entrant 66 is for fuel jets 42 of upper sheet 38, the combustion volume of zone Z2 is at least equal to one tenth of the total volume of the bowl, the area referred to as the compression zone is formed by inclined plane 68, concave surface 69, plane surface 70, convex surface 72 and plane surface 74. Angle a6 ranges between 10° and 75°, which allows to fuel jets 42 which create an aerodynamic motion above the piston and additionally to use the oxidizer in the compression zone. These aerodynamics allow better fuel/oxidizer mixing above the piston, notably upon expansion, thus promoting oxidation of the burnt gas, in order to promote the distribution of the fuel from jets 42 in the compression zone, a guiding surface 68 is provided between re-entrant 66 and surface 70. The guiding surface 68 can be rounded in the continuation of the re-entrant or substantially plane. The purpose of this guiding surface is to concentrate fuel jets 42 and to guide them towards convex surface 72. Thus, the guiding surface has an angle a7 at intersection point P whose difference with respect to sheet angle a2 is less than 45°, the position of inflection surface 69 is such that distances L5 and L6 are approximately of the same order (0.5<L5/L6<2). Thus, advantageously, the fuel jets will impact substantially at the same time the piston in the torus and the inflection zone respectively, diameter ID1 must be such that ID1/GD>1 and ID1< (GD+(Cb−GD)*2/3). This allows fuel jets 42 to optimize the aerodynamics above the piston.

Furthermore, ratio BD/L is less than 6 and preferably is less than 4,
ratio R2/R1 is less than 1 and preferably is less than 0.6,
ratio FD/BD is less than 1,
ratio Cb/BD is less than 2 to maintain complete vaporization of the fuel and to prevent wetting of the cylinder wall,
ratio GD/BD ranges between 0.7 and 1 for the torus aerodynamics and upflow of the fuel jets,
ratio H/L is greater than 40%, preferably is greater than 60% to minimize the oxidizer volume between the injector nozzle and the projection,
ratio L5/L6 ranges between 0.5 and 2 for the impact of the two sheets at the same time,
A1 ranges between 40° and 130° with a1=A1/2,
A2 ranges between 130° and 180° with a2=A2/2,
a3 is substantially equal to a1,
a4 is greater than 80°,
a5 ranges between 0° and 90° and preferably is substantially between 30° and 40°,
a6 ranges between 15° and 75°,
a7−a2 is less than 45°,
ratio ID1/GD is greater than 1,
ID1 is less than (GD+(Cb−GD)*2/3).

Thus, by means of this bowl parametrization, the fuel jets of lower sheet 36 directly target torus 64 and do not directly impact re-entrant 66.

Therefore, combustion of the lower fuel/oxidizer mixture occurs essentially in the torus volume while combustion of the upper fuel/oxidizer mixture occurs essentially in the compression zone and above the piston.

Furthermore, the interaction of the upper sheet jets with the lower sheet jets is limited, which allows the fuel/oxidizer mixture to be homogenized while meeting the mechanical strength constraints at high load.

Figure 3:
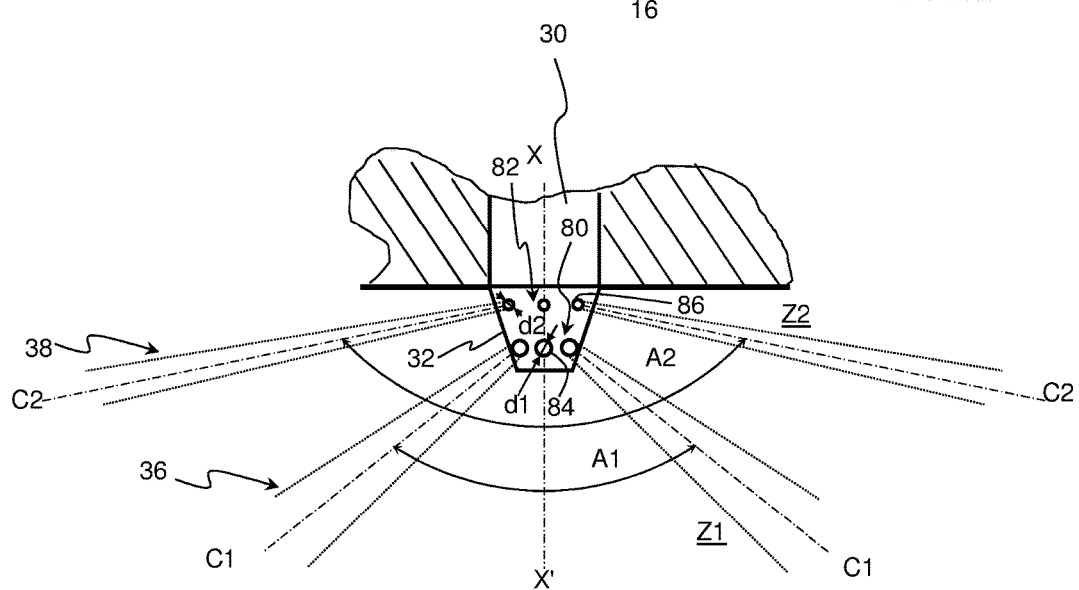
FIG. 3 illustrates on a larger scale the fuel injection for the engine of FIGS. 1 and 2.

FIG. 3 illustrates an example of the means for injecting fuel into the combustion chamber with a different flow rate for each sheet 36 and 38.

These means are a fuel injector 30 carrying, in the region of nozzle 32, at least two series 80, 82 of radial fuel injection orifices 84, 86 arranged substantially parallel to one another. The orifices are positioned circumferentially on the nozzle and the series are arranged one above the other. One of the series 80 comprises orifices 84 of diameter d1 through which the fuel is injected by forming lower jet sheet 36 of axis C1 for mixing zone Z1. The other series 82 comprises orifices 86 of diameter d2 for injection of the fuel forming upper jet sheet 38 of axis C2 for mixing zone Z2.

Advantageously, diameter d2 of orifices 86 is smaller than diameter d1 of orifices 84. As the injection pressure is identical in the region of the injector nozzle, this results in two fuel jet sheets with different flow rates. More precisely, upper sheet 38 has a lower flow rate than lower sheet 36.

Preferably, the flow rate of the upper sheet is at least 10% lower than the flow rate of the lower sheet, and ideally 20% to 40% lower.

The advantage of such a layout is that the theoretical injection velocity is identical for each row of orifices, which allows the fuel jets of both sheets to impact substantially at the same time the surface of the piston.

Thus, using a fuel injection with a different flow rate for each sheet allows adjustment of the amount of fuel to the volume of the associated combustion zone, and thus to improve the combustion quality.

Furthermore, a minimum 10% permeability difference between the sheets allows obtaining combustion providing maximum power to the engine while improving the combustion quality, which reduces at the source the unburnt hydrocarbon and soot particle emissions.

It can be noted that the ratio between the injected flows depends on the total flow of fuel to be injected and on the desired number of ports for the injector, as well as the volume ratio between the two mixing zones.

By way of example only, for a diameter d1 of orifices 84 of 150 microns for forming lower sheet 36 and a diameter d2 of orifices 86 of 130 microns for upper sheet 38, the difference in flow rate and therefore in mass (or amount) of fuel injected is approximately 25%.

Of course, without departing from the scope of the invention, each sheet may be carried by a distinct injector (single-sheet injector) with dedicated targeting in distinct zones Z1 and Z2 of the combustion chamber.

In this configuration, one of the injectors has a sheet angle and a permeability (static flow under a given pressure) different from the other injector, or the two injectors have different sheet angles and same permeability, but with a different injection pressure for each injector.

The invention claimed is:

1. A compression-ignition direct-injection internal-combustion engine comprising a cylinder, a fuel injection system including fuel injectors, a cylinder head carrying the fuel injectors, a piston sliding in the cylinder, a combustion chamber limited on one side by an upper face of the piston comprising a projection extending toward the cylinder head and located in a center of a concave bowl with at least two mixing zones, the first mixing zone comprising a torus and the second mixing zone comprising a concave surface, the fuel injection system projecting fuel in at least two fuel jet sheets with respectively different conical sheet angles, a lower fuel jet sheet having a jet axis extending toward and into the first mixing zone and an upper fuel jet sheet having a jet axis extending toward and into the second mixing zone, wherein the fuel injection system controls the fuel injectors to inject fuel into the combustion chamber with a first flow rate of fuel injection into the first zone and with a second flow rate of fuel injection into the second zone with the second flow rate of fuel injection being different than the first flow rate of fuel injection.

2. An internal-combustion engine as claimed in claim 1, wherein the fuel flow rate of the upper jet sheet is lower than the flow rate of the lower jet sheet.

3. An internal-combustion engine as claimed in claim 1, wherein the fuel flow rate of the upper sheet is at least 10% lower than the fuel flow rate of the lower sheet.

4. An internal-combustion engine as claimed in claim 2, wherein the fuel flow rate of the upper sheet is at least 10% lower than the fuel flow rate of the lower sheet.

5. An internal-combustion engine as claimed in claim 3, wherein the fuel flow rate of the upper sheet is 20% to 40% lower than the fuel flow rate of the lower sheet.

6. An internal-combustion engine as claimed in claim 4, wherein the fuel flow rate of the upper sheet is 20% to 40% lower than the fuel flow rate of the lower sheet.

7. An internal-combustion engine as claimed in claim 1, wherein the injectors respectively projecting the fuel in the fuel jet sheets are positioned axially one above the other, with each sheet having a different conical angle.

8. An internal-combustion engine as claimed in claim 2, wherein the injectors respectively projecting the fuel in the fuel jet sheets are positioned axially one above the other, with each sheet having a different conical angle.

9. An internal-combustion engine as claimed in claim 3, wherein the injectors respectively projecting the fuel in the fuel jet sheets are positioned axially one above the other, with each sheet having a different conical angle.

10. An internal-combustion engine as claimed in claim 4, wherein the injectors respectively projecting the fuel in the fuel jet sheets are positioned axially one above the other, with each sheet having a different conical angle.

11. An internal-combustion engine as claimed in claim 5, wherein the injectors respectively projecting the fuel in the fuel jet sheets are positioned axially one above the other, with each sheet having a different conical angle.

12. An internal-combustion engine as claimed in claim 6, wherein the injectors respectively projecting the fuel in the fuel jet sheets are positioned axially one above the other, with each sheet having a different conical angle.

13. An internal-combustion engine as claimed in claim 1, wherein injectors comprise at least two injectors projecting fuel in the fuel jet sheets having a different conical angle for each sheet.

14. An internal-combustion engine as claimed in claim 13, wherein the fuel injectors each have a different permeability.

15. An internal-combustion engine as claimed in claim 1, wherein the sheet angle of one of the sheets is at most 130° while the sheet angle of another of the sheets is at least 130°.

16. An internal-combustion engine as claimed in claim 2, wherein the sheet angle of one of the sheets is at most 130° while the sheet angle of another of the sheets is at least 130°.

17. An internal-combustion engine as claimed in claim 3, wherein the sheet angle of one of the sheets is at most 130° while the sheet angle of another of the sheets is at least 130°.

18. An internal-combustion engine as claimed in claim 5, wherein the sheet angle of one of the sheets is at most 130° while the sheet angle of another of the sheets is at least 130°.

19. An internal-combustion engine as claimed in claim 7, wherein the sheet angle of one of the sheets is at most 130° while the sheet angle of another of the sheets is at least 130°.

20. An internal-combustion engine as claimed in claim 13, wherein the sheet angle of one of the sheets is at most 130° while the sheet angle of another of the sheets is at least 130°.

21. An internal-combustion engine as claimed in claim 14, wherein the sheet angle of one of the sheets is at most 130° while the sheet angle of another of the sheets is at least 130°.

22. A fuel injection method for a compression-ignition direct-injection internal-combustion engine comprising a fuel injection system including fuel injectors, a cylinder, a cylinder head carrying the fuel injectors, a piston sliding in the cylinder, a combustion chamber limited on one side by an upper face of the piston comprising a projection extending toward the cylinder head and located in a center of a concave bowl, at least two mixing zones, the first mixing zone having a first fuel jet axis and including a torus and the second zone having a second fuel jet axis and including a concave surface, comprising:

injecting the fuel in the at least two fuel jet sheets with the fuel jet sheets having different concave sheet angles with a different amount of fuel being injected into the combustion zones by the fuel jet sheets with the first fuel jet axis extending toward and into the torus and the second fuel jet axis extending toward and into the second zone.

23. An injection method as claimed in claim 22, comprising injecting the fuel in amounts which differ in each sheet by at least 10%.

* * * * *